Aug. 30, 1932. E. KEEN 1,875,244
APPARATUS FOR TAKING AND PROJECTING MOTION PICTURES
Filed Sept. 7, 1929 5 Sheets-Sheet 1
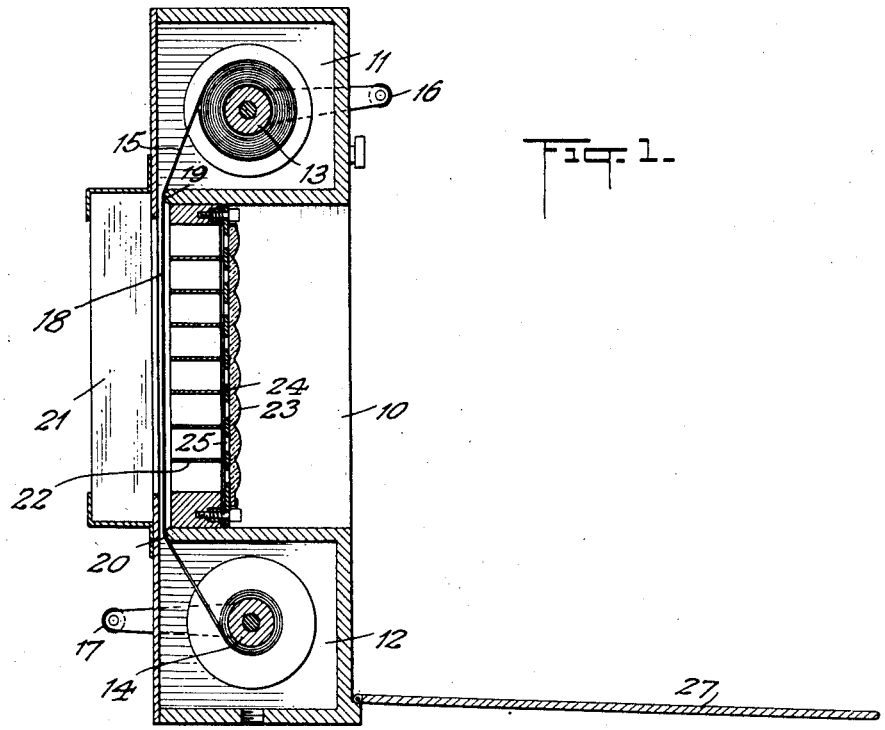
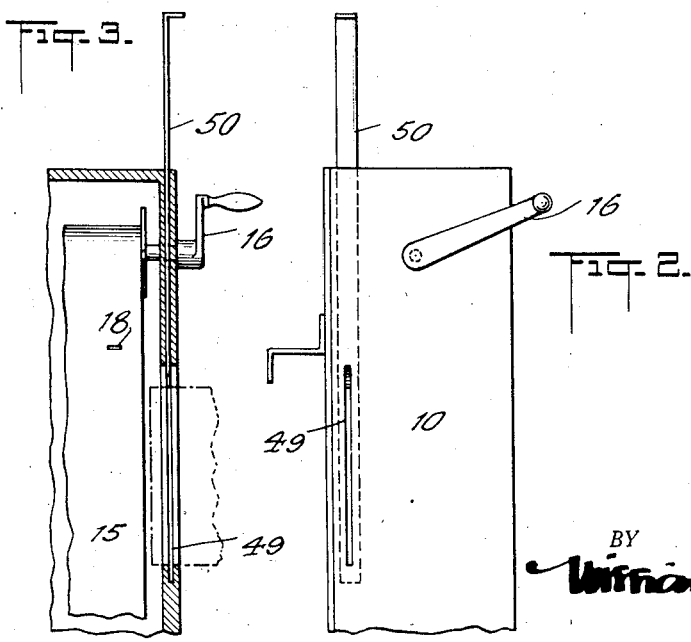
INVENTOR.
ELIOT KEEN
BY
ATTORNEY.

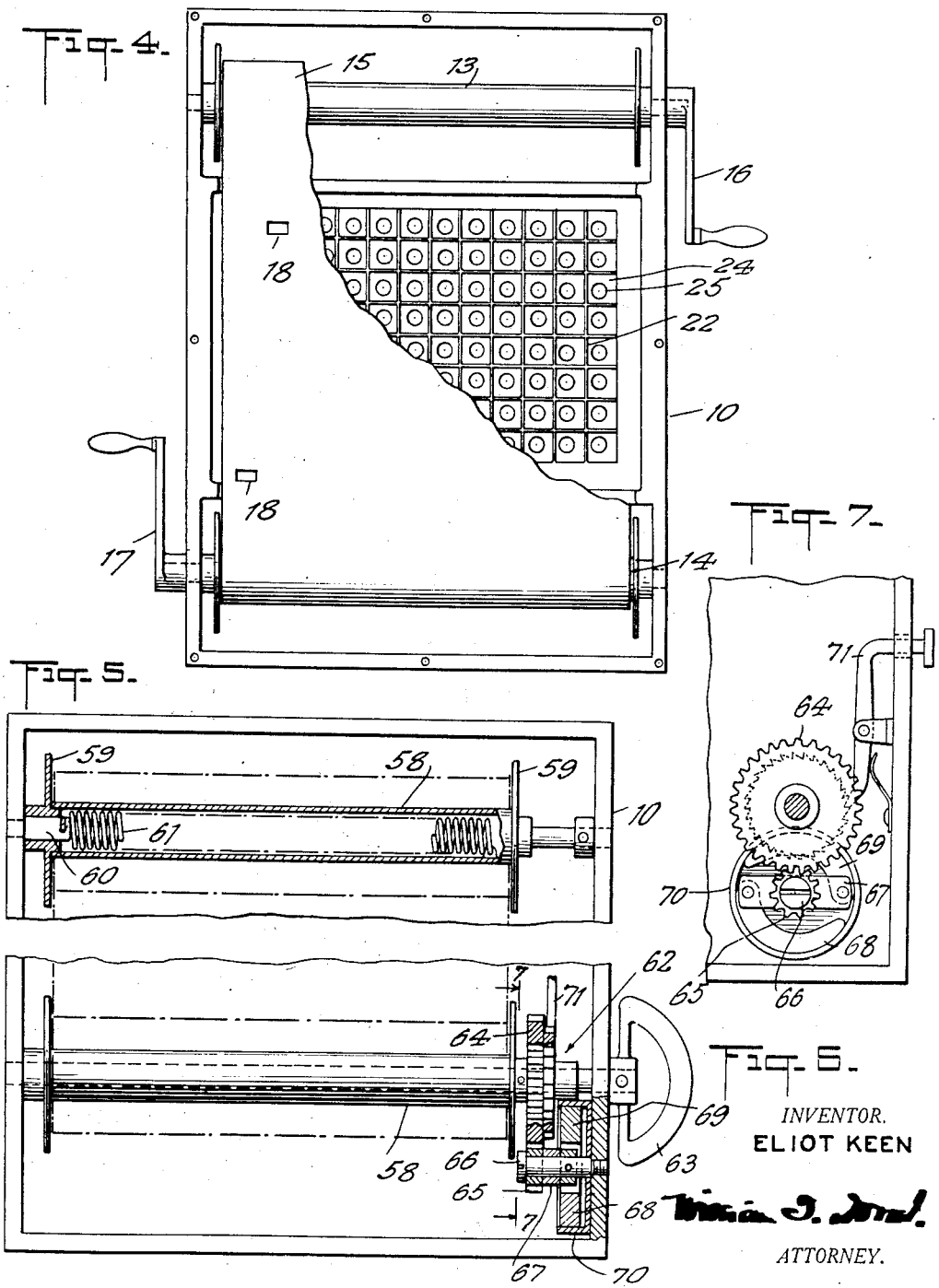

Aug. 30, 1932.  E. KEEN  1,875,244
APPARATUS FOR TAKING AND PROJECTING MOTION PICTURES
Filed Sept. 7, 1929  5 Sheets-Sheet 3
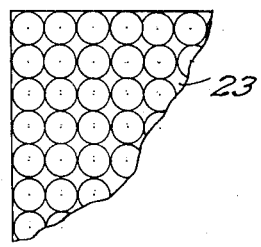
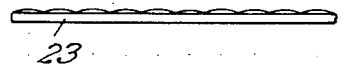
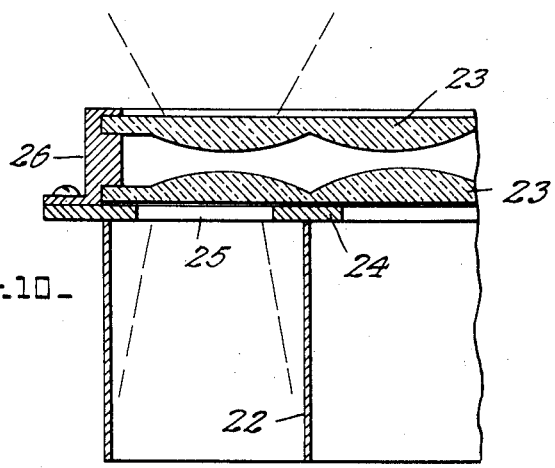
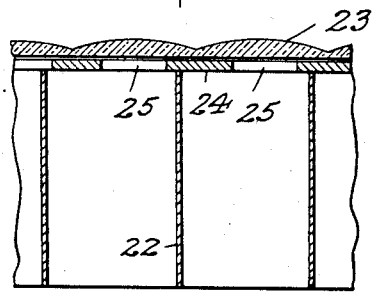
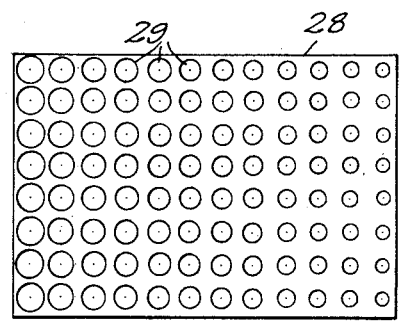
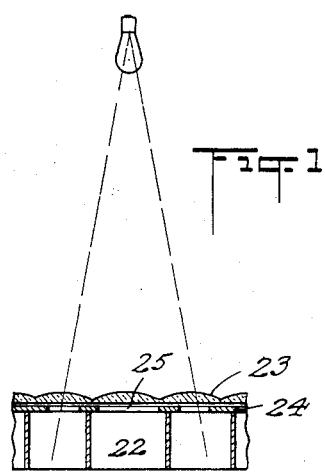
INVENTOR.
ELIOT KEEN
BY
ATTORNEY.

Aug. 30, 1932.     E. KEEN     1,875,244
APPARATUS FOR TAKING AND PROJECTING MOTION PICTURES
Filed Sept. 7, 1929    5 Sheets-Sheet 4
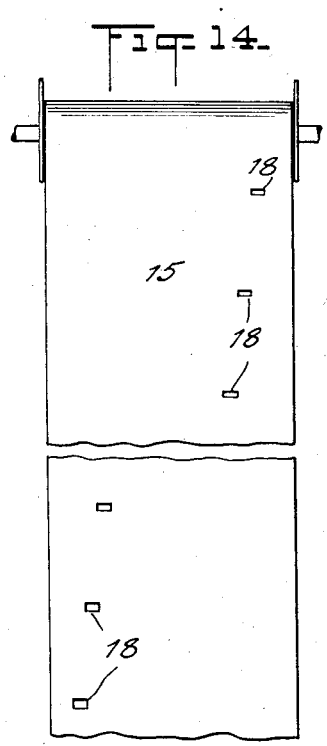
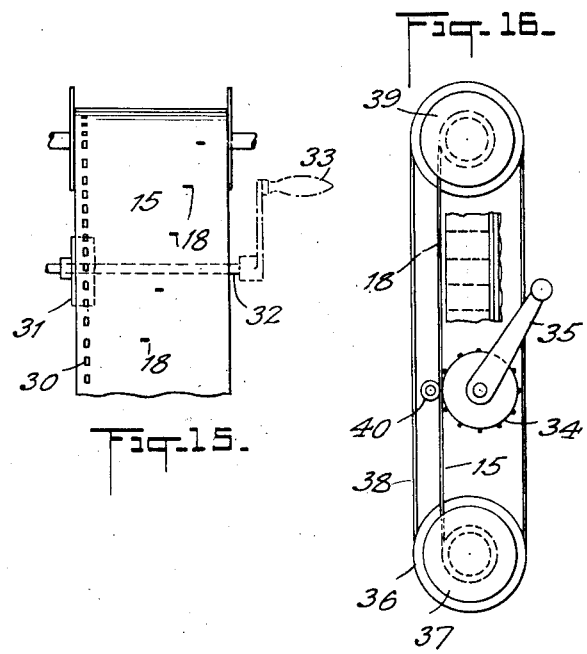
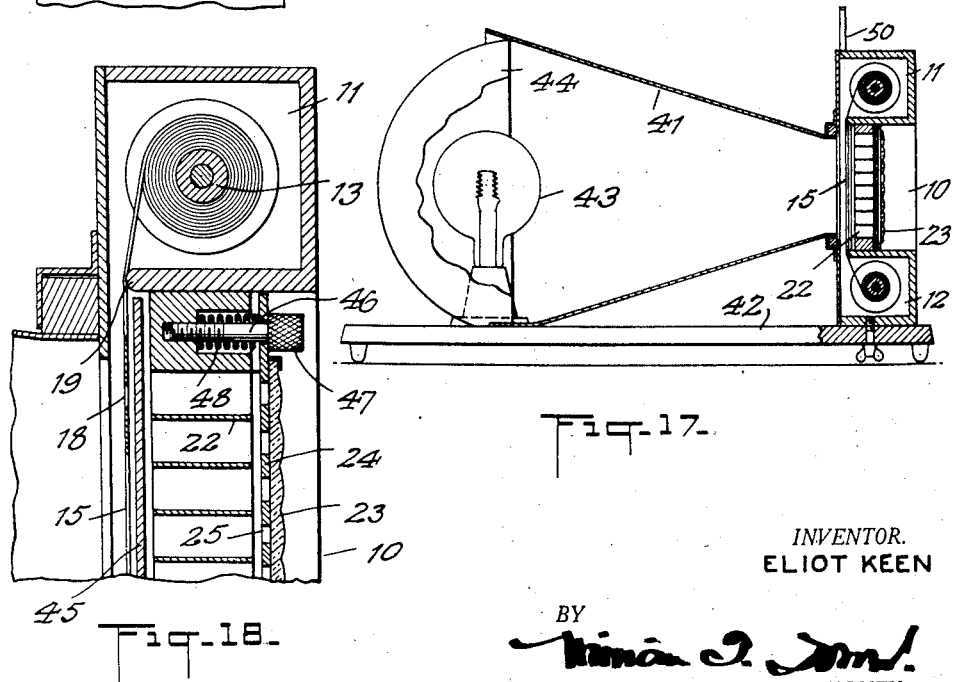
INVENTOR.
ELIOT KEEN
ATTORNEY.

Aug. 30, 1932.  E. KEEN  1,875,244
APPARATUS FOR TAKING AND PROJECTING MOTION PICTURES
Filed Sept. 7, 1929  5 Sheets-Sheet 5
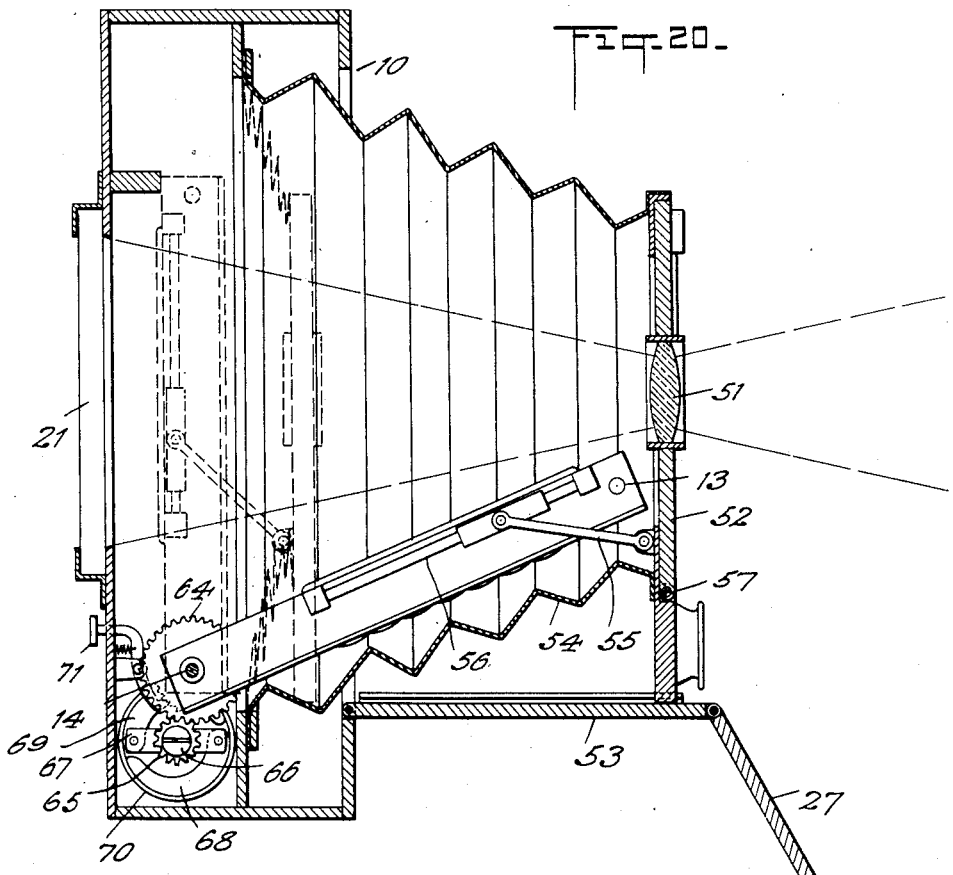
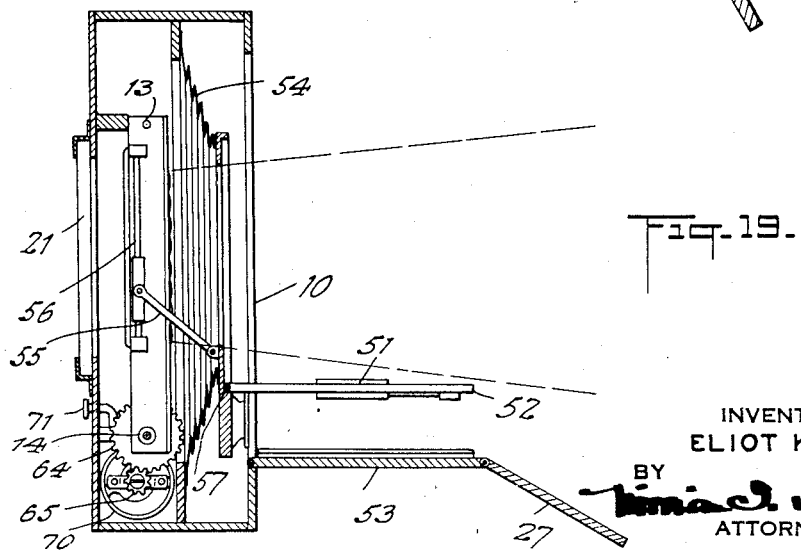
INVENTOR
ELIOT KEEN
BY
ATTORNEY Patented Aug. 30, 1932

1,875,244

UNITED STATES PATENT OFFICE

ELIOT KEEN, OF JACKSON HEIGHTS, NEW YORK

APPARATUS FOR TAKING AND PROJECTING MOTION PICTURES

Application filed September 7, 1929. Serial No. 390,904.

This invention relates to new and useful improvements in apparatus for taking and projecting motion pictures and has for a main object the provision of an apparatus whereby a motion picture may be taken on an ordinary film such as is customarily used in snap-shot cameras wherein in a film approximately 2¼" x 3¼" is employed, and projected from the print thereof.

A further object is to provide a simple and efficient projection lamp attachment so that the camera may be quickly and easily transformed into a projector at will.

A still further object is to provide a device in which the lens unit is very economically constructed, the exposures are made of equal duration, the focussing of the entire bank of lenses is simplified, and in which the projected image on the screen is steadied.

Yet another object is to provide means whereby projection of pictures through an inflammable film is possible without danger of fire and whereby the one camera may be used to take either still pictures or moving pictures utilizing the same film in either case.

Further and more specific objects, features, and advantages will more clearly appear from the detailed description given below when taken in connection with the accompanying drawings which form part of the specification, which illustrate one preferred present embodiment of the invention, and in which Fig. 1 is a view in vertical section taken through a side elevation of the apparatus when employed as a motion picture camera;

Fig. 2 is a side elevation of the camera showing the means for closing the positive slit;

Fig. 3 is a rear view of the same construction;

Fig. 4 is a rear view of the camera, with the back plate removed and a portion of the shutter cut away;

Fig. 5 is a detail view of a spring motor drive;

Fig. 6 is a detail view of the governor mechanism for such a drive;

Fig. 7 shows the means for winding the drive mechanism;

Fig. 8 shows a portion of the bank of lenses;

Fig. 9 is a side view of a lens bank;

Fig. 10 illustrates a construction wherein a double bank of such lenses are employed;

Fig. 11 is a detail view of the manner in which the lenses are placed in the bank;

Fig. 12 illustrates the correction method used to control the area photographed;

Fig. 13 is a plan view of the bank of lenses;

Fig. 14 is an elevation of a portion of the movable shutter;

Fig. 15 is a modified view of a different form of shutter;

Fig. 16 is a view of the drive for the special form of shutter;

Fig. 17 is a view of the camera combined with a lamp house to act as a projector;

Fig. 18 is a detail of the projector construction;

Fig. 19 is a view of a modification showing the camera adapted for use either as a movie or still camera; with the parts in the position for moving picture work; and, Fig. 20 is a similar view showing the parts in the position for use in still picture work.

Before describing in detail the preferred present form of the invention shown in the accompanying drawings, it is desirable to contemplate the invention in general terms so as to clearly visualize the main features involved apart from the detail construction whereby they are applied to the specific form of apparatus shown. In general therefore, it is purposed to take a camera which will use a film or film-pack of the ordinary type and on it impose a large number of pictures of a given object, preferably a moving object, all within a short space of time say ten or fifteen seconds.

To achieve this object there is placed within the camera a bank or block of lenses of the approximate area of the film in front of which the lens bank lies. This bank comprises a series of separately mounted lenses which are arranged in a series of rows, for instance, eight in a vertical row, with twelve rows altogether, making ninety six lenses. These lenses are preferably manufactured out of a single blank by a simple stamping operation and are so related to each other and the film that they correct for the varying angle at which the light from a given object falls on them so that the images on the film will all be clear and undistorted.

At the top and bottom of the camera are disposed chambers which house the rolls for the shutter which may be a thin brass ribbon provided with apertures spaced apart and staggered therein so that as the shutter is moved by a steady spring pressure from a governed motor, the apertures will successively be drawn across their respective series or rows of lenses so that the film receives the light impressions of ninety six separate and successive pictures of the object or scene being photographed. The motor driving the shutter is controlled to give a steady uniform motion to the shutter which can be released for motion by the pressing of a finger.

When the apparatus is to be used as a projector of the picture just above described, then the film pack at the back is removed and a lamp housing is attached. In this form the film to be projected on the screen is disposed between the movable shutter and the lenses so that the metal shutter will carry off most of the heat from the lamp and thus protect the film from fire. In this instance also the film is disposed at a different distance from the lenses so that a focusing device is provided to adjust the lens back as desired.

In a still further modification of the invention the camera is provided with the usual lens mount for still pictures as well as with the bank of lenses for moving picture work as above described. When still pictures are to be taken, then the bank of lenses is moved to one side to permit the usual lens to act and when moving pictures are to be taken, then the usual lens mount can be moved aside to permit the bank of lenses to act.

The present preferred form of the invention is shown in the drawings and comprises a box 10 of the usual type having upper and lower chambers 11 and 12, within which are disposed roll shafts 13 and 14 on and between which there is wound and unwound a shutter sheet 15. This winding may be effected by means of crank arms 16 and 17 attached respectively to the ends of the roll shafts. The shutter sheet is preferably made of thin sheet metal so as to be pliable and carry off heat quickly. It is provided with a series of staggered holes or apertures such as 18. The shutter passes over a bearing edge or surface 19 on the casing and then across the back of the box to another bearing edge such as 20 and thence into the lower chamber 12, or vice versa as the case may be. In so passing the shutter moves in front of a film holder 21 which may contain a roll of film or may be a film-pack holder as desired. This holder 21 is readily attached to and removed from the back of the box, in any suitable manner.

As the shutter moves across the back of the box, it passes in back of a bank of lenses contained in a case or honey-comb such as 22. This honey-comb is divided into a large number of separate cells in the front end of each of which is disposed a lens such as 23. Preferably the lenses 23 are not disposed in the end of the cell but are disposed across the front end of the cells and formed in one piece by being molded or cast and then stamped into shape by suitable dies. It will be observed that the lenses are arranged in series running evenly in vertical and horizontal rows across the bank.

Assuming that the shutter sheet 15 is being wound downward as shown in Fig. 1 then the first of the apertures therein will be disposed to pass down across the first or left hand vertical row of lenses in the honey-comb. As it reaches and passes the bottom of the particular series of lenses, a second aperture therein is ready to pass down across the next vertical row of lenses and so on until the entire series of vertical rows of lenses have been covered or crossed by the successive apertures in the shutter. Thus ninety six lenses will be exposed at a uniform rate of speed and each exposure will affect a separate section of the same film to leave a proper image thereon. Back of the honey-comb of lenses 23 is a diaphragm plate 24 which has a series of stop openings 25 therein. This plate may be removed to substitute another plate with larger or smaller openings therein as the photographic requirements may demand. As shown in Fig. 10 a double set of lenses may be used in combination and held by a common or encircling band 26 which may be fastened to the diaphragm plate 24. It will also be noted from Figs. 11 and 12 that the optical centers of the lenses are differently oriented with respect to the centers of the diaphragm openings and cell axes. This, as seen especially in Fig. 12, is to counterbalance the different angles at which the light from the object will hit the lenses and to insure it resulting in a series of properly centered images on the film. The eccentricity of each lens with respect to the cell axis depends upon the angle of light incidence and varies therewith. This is especially useful for close work such as portrait and short focus close-ups. After one film has been exposed, the door 27 can be closed and the shutter 15 rewound and a new film substituted for the exposed one.

The focal length of the lenses of Fig. 8 is the same. I have found that plano-convex lenses of 10 mm. radius at about ¾ of an inch are practical. Lens diameter is about ¼ of an inch. The plane side of the lens plate is ground and polished. In Fig. 10 the lenses as shown form an anastigmatic arrangement, the upper group being of crown glass and the lower of flint glass. Such combination increases the lens speed and effects economy.

As shown in Fig. 13, there is a diaphragm plate 28 having a series of openings 29 therein the size of which diminishes progressively in one direction. The reason for this is that as the shutter is wound up on the roll, the linear speed of it increases for a given angular speed of the crank shaft and therefore the later shutter openings move across the lenses at a higher speed. Therefore the diaphragm openings along this part of the bank need to be larger to give the same light exposure for all cells. An alternative manner of producing this result is shown in Fig. 14 in which the shutter openings 18 are of gradually increasing area so that as the shutter ribbon 15 winds on the roll the shutter openings get larger for the reason above mentioned.

Since the speed of the shutter thus varies slightly, it is proposed to overcome this in various ways. One way is shown in Fig. 15 in which the shutter has holes 18 of equal size and a series of sprocket holes 30 therein engageable by teeth in a sprocket wheel 31 on shaft 32 operated by crank 33. In this case the speed of openings 18 past the lenses 23 is even. In another method of solving this problem shown in Fig. 16, a sprocket 34 is turned by crank 35 and moves the ribbon 15 having equally spaced openings 18. Rigidly mounted on flange 36 is pulley 37 carrying spring belt 38. Pulley 39 carries the belt 38 on the other roller. The belt 38 is elastic and takes up the shutter as the sprocket moves it in either direction. 40 is an idler pulley to keep sprocket holes for the shutter ribbon in mesh with the teeth of the sprocket wheel 34.

In Fig. 17 is shown a camera used as a projector with the film holder 21 removed and a lamp casing 41 of conical shape attached in place thereof at its smaller end. The camera box 10 and the lamp casing 41 are both fastened in a suitable manner to a supporting plate 42. The casing 41 has a lamp 43 and parabolic reflector 44 to concentrate the light on the shutter 15. Because the heat on the camera is rather great, the shutter in this instance is disposed between the light and the positive film. Referring to Fig. 18, it will be seen that the film positive 45 is disposed in front of the shutter 15 and that the bank of lenses 23 and their honey-comb support 22 are supported in an adjustable manner. This is for the reason that the film now is in a different position from that in which it was when the pictures were taken originally. Therefore the lenses must be focused for the new film position. This is effected by having a plurality of adjusting screws such as 46 threaded into the honey-comb frame 22 and provided with a shouldered head 47 bearing against the diaphragm plate 24. A spring 48 in a recess around the screw 46 bears against the rear face of the plate 24 to hold it against the shoulder of the head 47. By turning the screw 46 the position and distance of the lens bank from the film 45 may be accurately determined and thus focused properly. Thus the light coming from reflector casing 41 will fall in a concentrated manner on the shutter 15 and pass through the holes therein as the shutter moves across the film and thence through a series of lenses which are properly focused to throw a clear image on the screen.

Referring to Figs. 2 and 3, it will be seen that the side of the camera box 10 has a slot 49 therein through which a positive film or slide may be inserted in front of the shutter 15. This slot is ordinarily covered and closed by a sliding tongue 50 which can be easily slid up and down as desired.

Referring to Figs. 19 and 20 it will be seen that a combined still picture and moving picture camera is shown. When this camera is opened, the lens 51 carried in the usual way by the front board 52 held by the extension 53 focuses upon the film which is held by the film pack holder 21, and the bellows 54 and box 10 prevent the introduction of light. By means of the link 55, the moving picture mechanism has been tilted forward, (see Fig. 20) so as not to interfere with the use of the single lens camera. It will be noted that the mechanism 56 is the same moving picture mechanism which has already been described. The lenses 23 and the rollers 13 and 14 are shown. When the camera is closed the front boards 52 takes the position shown in dotted lines in Fig. 20, and the moving picture mechanism goes back to its proper position shown also in dotted lines in Fig. 20.

To make a moving picture with this combination, the camera bellows 54 is not extended, but with the bellows closed, the front board 52 is opened on hinge 57. When this opening is made, the lenses of the moving picture camera are exposed and the moving picture may be taken. The spring action controlled by the governor draws the shutter ribbon across the lenses as will be hereinafter described.

A spring motor drive may be used instead of the hand cranks, and the details of this operation are shown in Figs. 5, 6, and 7. In Fig. 5 the shutter spool 58 ends in a flange 59 turning upon pin 60 which is rigid. To this pin 60 is fastened spring 61 and the other end of the spring is attached to the spool 58. Turning this roller will wind up the spring. In Fig. 6 is shown the mechanism at roller 62 by means of which the spring is wound and the governor engaged. A handle 63 is rigidly connected to the spool 58. A gear 64 is fixed to the roller shaft and is engaged by pinion 65 on shaft 66. On the same shaft with the pinion is an arm 67 carrying governor weights 68 and 69. The centrifugal force throws the weights against a stationary drum 70 when the pinion 65 is revolved thus causing a braking action. This action of the spring 61 may be released by means of a trip finger such as 71 shown in Fig. 20 and may stop the rotation of the roller in any suitable manner.

While the invention has been described in detail and with respect to a preferred present form thereof, it is not intended to be limited to such details or forms since many changes and modifications may be made and the invention embodied in other forms without departing from the spirit and scope of the invention in its broader aspects. Therefore it is intended to cover all forms and modifications which may come within the language or scope of any other one or more of the appended claims.

I claim:

1. A camera comprising a honey-combed frame, a plurality of lenses supported adjacent one face of the frame, a diaphragm plate disposed between the lenses and the frame, a roller, and a flexible moving apertured shutter disposed for movement across the opposite face of the frame by winding upon said roller, the successive apertures in the shutter being of progressively increased area, such apertures being adapted to be moved across the opposite face of the frame in the same operation, thereby compensating for variation in shutter speed.

2. A camera comprising a honey-comb frame, a plurality of lenses supported adjacent one face of the frame, a diaphragm plate disposed between the lenses and the frame, a roller, and a flexible moving apertured shutter disposed for movement across the opposite face of the frame by winding on said roller, the openings in the diaphragm having a progressive increase in area in the sequence in which the apertures in the shutter uncover said openings, such apertures being adapted to be moved across the opposite face of the frame in the same operation, thereby compensating for variation in shutter speed.

3. A camera comprising a honey-comb frame, a plurality of lenses formed of one kind of glass in a single piece and disposed adjacent the face of the frame, and a second series of lenses formed of another kind of glass in a single piece and disposed adjacent the first piece to form a combination lens.

4. A camera comprising a honey-comb frame, a plurality of lenses formed of one kind of glass in a single piece and disposed adjacent the face of the frame, and a second series of lenses formed of another kind of glass in a single piece and disposed adjacent the first piece to form a combination lens, and a diaphragm plate disposed between the combination lens and the adjacent face of the frame.

5. A camera comprising a honey-comb frame, a plurality of lenses formed of one kind of glass in a single piece and disposed adjacent the face of the frame, a second series of lenses formed of another kind of glass in a single piece and disposed adjacent the first piece to form a combination lens, a diaphragm plate disposed between the combination lens and the adjacent face of the frame, and an apertured shutter movable across the opposite face of the frame.

6. A camera comprising a casing, a bank of moving picture lenses therefor, a still picture lens and mount therein, a bellows connecting the still picture lens with the casing, means for moving the bank of lenses out of the optical axis as the still picture lens and mount are moved to operative position, the still picture lens being hinged in its mount to be moved out of the optical axis without moving the amount when the moving picture lens bank is to be employed.

7. In a multiple lens camera, a holder for a light sensitized surface, a plurality of lenses, each adapted to project an image upon said surface, said lenses being formed in a single sheet of glass, and a honey-comb frame such that each lens is aligned within a cell of the frame.

8. A camera comprising a casing, a bank of moving picture lenses therein, means adapted to hold a still picture lens including a mount therefor, a bellows adapted to connect the still picture lens with the casing and a movable connection between said moving picture lens bank and said means for holding said still picture lens, such that when the bellows are extended for use with the still picture lens, the moving picture lens bank is moved to inoperative position out of the path of rays from the still picture lens.

9. A camera comprising a honey-comb frame having a plurality of rows of passages therethrough, a bank of lenses comprising a plurality of rows, supported adjacent to one face of said frame with one lens in alignment with each passage, a diaphragm plate having an aperture registering with each lens and disposed between said lens and the frame, a flexible shutter, and means for supporting and moving the same close to and across the face of the frame remote from said lenses, said shutter having a series of staggered apertures therein, successive apertures adapted to move across successive rows of passages in the honey-comb frame and means for supporting a sensitized film immediately adjacent to the back of the shutter.

10. A camera comprising a honey-comb frame having a plurality of parallel series of apertures therethrough, a plurality of parallel series of lenses supported adjacent to one face of said frame, one lens being in alignment with each aperture in the frame, a flexible shutter having a series of staggered apertures of uniform size, successive apertures being adapted to sweep across successive rows of openings in the honey-comb frame, said shutter being arranged to move across the face of the frame remote from the lenses, means for supporting a sensitized film closely adjacent to the face of the shutter remote from the frame, and means for moving said shutter at a uniform speed.

11. A cinematographic apparatus comprising a plurality of lenses arranged in parallel rows, a flexible metal shutter having a plurality of staggered apertures therein, means for supporting and moving said shutter so as to cause successive apertures to sweep across the axes of the lenses in successive rows, light projecting means mounted adjacent the side of said shutter remote from said lenses, and means for stationarily supporting a multiple photographic positive between said shutter and said lenses with an individual positive picture in alignment with each lens.

12. A camera comprising a still picture lens, a movable support therefor, a bank of lenses for moving picture work comprising a plurality of parallel rows of lenses, a flexible shutter having a series of staggered apertures therein adapted to cooperate with said bank of lenses, a movable support for said bank of lenses and said shutter, a support for a sensitized surface, and means for moving one type of lens out of the optical axis when the other type of lens is to be used, and vice versa.

13. In a motion picture projector, a plurality of stationary lenses, a photographic positive having a plurality of separate images showing successive views of a scene, means for mounting said lenses and photographic positive in fixed relationship with a separate image on said positive in optical alignment with each of said lenses, and means for projecting a beam of light through each separate image and its lens in rapid sequence so as to produce a motion picture.

14. In a motion picture projector, a sheet of glass having a plurality of lenses formed thereon, a photographic positive having a plurality of separate images showing successive views of a scene, means for mounting said lenses and photographic positive in fixed relationship with a separate image on said positive in optical alignment with each of said lenses, and means for projecting a beam of light through each separate image and its lens in rapid sequence so as to produce a motion picture.

15. In a cinematographic apparatus, a lens element comprising a honey-comb frame and a sheet of glass comprised of a plurality of circular convex lenses mounted adjacent to said honey-comb frame, said lenses being arranged in parallel rows and coinciding with the apertures in said honey-comb frame, the optical axes of said lenses being parallel and all of said lenses having the same focal length, and means comprising a body forming an aperture for each lens for stopping down said lenses.

16. In a cinematographic apparatus, a shutter comprising a strip of flexible opaque material having a longitudinal series of staggered apertures therein, each aperture being spaced longitudinally and laterally from the preceding aperture, spaced means for winding up either end of the shutter with progressively increasing lineal speed, each of said apertures being of increased size along the dimension parallel to the movement of the shutter so as to compensate for variation in the speed of movement of the shutter incidental to the winding up of the shutter.

17. In a cinematographic apparatus, a honey-comb, an aperture diaphragm plate in effective position in respect of said honey-comb, a lens plate carried by said diaphragm plate, and means for adjusting the position of said plate carrying said lenses toward and away from said honey-comb.

Signed at New York, New York, this 5th day of September, 1929.

ELIOT KEEN.